United States Patent

Koski et al.

[15] 3,653,912

[45] Apr. 4, 1972

[54] PREPARATION AND USE OF A BLAND DISPERSIBLE FOOD PROTEIN

[72] Inventors: William E. Koski; Donald E. Smith; Ali R. Touba, all of Minneapolis, Minn.

[73] Assignee: General Mills, Inc.

[22] Filed: Dec. 22, 1969

[21] Appl. No.: 887,308

[52] U.S. Cl..................................99/64, 99/17, 99/98, 99/99, 260/123.5
[51] Int. Cl..........................................A23c 11/00
[58] Field of Search..................99/64, 98, 99, 17; 260/123.5

[56] References Cited

UNITED STATES PATENTS

| | | | |
|---|---|---|---|
| 3,097,497 | 7/1963 | Kemmerer | 99/99 X |
| 2,269,958 | 1/1942 | Urquhart | 260/123.5 X |
| 2,588,392 | 3/1952 | Julian et al. | 260/123.5 |
| 3,096,177 | 7/1963 | Ariyama | 99/64 |

FOREIGN PATENTS OR APPLICATIONS 70,049   9/1961   India..........................................99/64

OTHER PUBLICATIONS

Soybean Milk; U.S. Dept. of Agr., Agr. Research Serv.; N. Util. Res. and Dev. Div.; CA- N- 13, Jan. 1961; pages 1 and 2,

*Primary Examiner*—S. Leon Bashore
*Assistant Examiner*—Frederick Frei
*Attorney*—Anthony A. Juettner and Norman P. Friederichs

[57] ABSTRACT

A beverage is provided which includes a soy product which has been modified by dispersing soy material in water, adding an alkaline substance such as sodium hydroxide to raise the pH to about 12 and then adding an acidic material to reduce the pH to about 7 to 8. The resulting solution may be spray dried. A high protein beverage may be produced by dissolving the modified dry soy material, for example, in water. The modified soy material may alternatively be added to cow's milk to provide a beverage of very high protein content. The beverage may include other flavoring material, such as chocolate.

10 Claims, No Drawings

PREPARATION AND USE OF A BLAND DISPERSIBLE FOOD PROTEIN

BACKGROUND OF THE INVENTION

The present invention relates to a beverage such as for human consumption and more particularly to a high protein beverage containing a soy material.

A large portion of the world's population today is undernourished due to inadequate diet and projected population figures indicate that this number will increase. Protein is one of the principal deficiencies in the diet of these persons. For example, the amount of meat available, particularly in the very heavily populated countries of the world, is at best limited. Furthermore, the cost of meat when available is beyond reach of many persons. Thus, a need exists for a low cost, readily available protein dietary supplement.

Soybean products provide material of high protein content. The interest in soybean products as supplements and replacements for other dietary proteins has noticeably increased in recent years as evidenced, for example, by the vegetable protein meant analogs. Another soybean product available as a dietary protein supplement is soy milk. Soy milk may be used as a replacement for cow's milk. Soy milk has been known for many years and is typically prepared by the method disclosed in U.S. Pat. No. 1,444,812. The soybean is soaked in water, washed and then ground or mashed. The resulting material is mixed with water and passed through a filter press or centrifuged to remove the large solid particles, principally cellulose. The filtrate, which is milky white in appearance, is dried, such as by spray drying. The resulting powder can be reconstituted for use as soy milk simply by adding water.

Soy milk possesses certain characteristics that make it highly desirable as a dietary protein supplement. Soy milk is inexpensive and thus can be economically available to persons of low income. Soy milk can be provided in a dry form and therefore can be stored for extended periods without refrigeration. Dry soy milk can be converted to an edible form simply by the addition of water. It is also very similar in appearance to cow's milk. Soy milk does possess certain disadvantages, however. Generally it has a taste that is somewhat "-beany" and thus some people object to the taste. Soy milk has a limited solubility and therefore the amount of soy protein provided in soy beverages has been limited in the past.

GENERAL DISCUSSION OF THE INVENTION

The present invention provides a highly desirable dietary protein supplement in the form of a beverage which is made from soy material. The soy material is modified to improve the solubility and may, for example, have a solubility more than double that of conventional soy material. The modified soy material has improved taste. In other words, the "beany" taste, so often a characteristic of soy material, is substantially reduced or even eliminated. The beverage product of the present invention may be provided by adding the dried modified soy material to water, thereby forming an improved soy milk having a protein content as high or even higher than cow's milk. Alternatively, the beverage product of the present invention can be produced by adding the modified soy material to other beverages such as cow's milk or orange juice resulting in a beverage of very high protein content. The beverage may have, for example, up to 15 percent protein by weight, preferably between 3 and 12 percent protein.

The modified soy material of the present invention is produced by treating soy material such as soy milk or other high protein soy material. The soy material is dispersed in water and solubilized by the addition of an alkaline substance, typically, sodium hydroxide. The solution may be raised to a pH of at least about 12. An acidic material is then added to lower the pH to neutral or near neutral. The resulting solution is then spray dried.

Processes have been known in the past in which soy protein is purified by solubilizing the soy protein with alkali and then acidifying the solution to precipitate the soy protein. Such processes are shown in U.S. Pat. No. 2,007,962 and U.S. Pat. No. 2,588,392. Such prior processes differ markedly from the present invention in that the pH in these processes is lowered to the isoelectric point where precipitation of the protein takes place. The pH at the isoelectric point is generally in the range of pH 4.2 to 5.2. In the present invention the pH is lowered only to about neutral, typically, pH 7.0 to 8.0 and thus above the isoelectric point. The proteins, therefore, remain in solution.

Starting material may be a soy milk or other bland soy material preferably containing between 30 and 70 percent protein, usually 40 to 60 percent protein. Soy materials having a larger protein content, however, may be used with less preferred results. Such materials may be obtained by removing at least a part of the non-protein constituents of defatted soy flour, meal or flakes by any of various means. Such materials may be obtained by alkaline extraction and acid precipitation using conventional techniques such as disclosed in U.S. Pat. No. 2,588,392. For example, they can be prepared by the extraction of defatted soybean flakes or similar source material with dilute aqueous solutions of sodium hydroxide followed by precipitation of the extracted protein with an acid at the isoelectric point. Typical acids used in such processing include hydrochloric acid, sulfuric acid, and sulfurous acid.

In carrying out the present invention any of a variety of water soluble alkaline materials can be used to raise the pH of the starting soy protein material. Preferred alkaline materials are the inorganic bases and salts such as sodium hydroxide, ammonia, ammonium hydroxide and trisodium phosphate. The amount used will depend somewhat upon the particular alkaline material. However, when an aqueous dispersion containing about 5 to 20 percent by weight soy protein is treated with sodium hydroxide it is preferable that the weight ratio of soy protein to sodium hydroxide be between 8:1 and 20:1. Under these conditions, it is preferred to carry out the alkaline treatment for from about 2 minutes to 1 hour. It is more preferable to carry out the alkaline treatment for from about 2 minutes to 15 minutes. Any of a variety of acids may be used in lowering the pH to neutral or near neutral. Typical acids would include citric acid and phosphoric acid. However, other acids such as hydrochloric and lactic acid may be used. During the addition of the acid it is preferable that the soy protein solution be stirred in order to disperse any beads of precipitated protein that might form as the acid is being added. The pH of the solution should be reduced to about 7.0 to 8.0. The modified soy protein, at or near the neutral point, has a substantially improved solubility and therefore beverages of very high protein content can be produced. For example, if reconstituted with water to form an aqueous solution, the resulting beverage will usually contain at least as much protein as cow's milk and, if reconstituted with cow's milk, may contain 1½ to 2 times as much protein as normal cow's milk.

The modified soy protein may be used as the resulting aqueous solution or it may be dried and reconstituted by the addition of the dry modified soy material to an aqueous liquid prior to use. Preferably the drying is carried out using spray drying techniques. However, other drying techniques may be used with less satisfactory results. Other materials may be added prior to or subsequent to the drying step. For example, one may add flavoring such as chocolate or fruit juices to the modified soy material.

The beverage will typically be prepared by adding a nutritionally significant amount, for example, up to 20 parts of the dry modified soy material to 100 parts of water, by weight. If desired, flavoring may be added. The beverage, alternatively, may be prepared by adding a nutritionally significant amount, for example, up to 15 parts of the dry modified soy material to 100 parts of cow's milk by weight.

EXAMPLE I

A beverage was prepared according to the present invention using Textrol[1] ([1]Trademark of Central Soya Company, Inc. Textrol contains about 58.9 percent soy protein, 5.7 percent ash and 7.1 percent moisture. Prior to modification, about 38 percent of the protein was soluble.). The Textrol was modified to improve flavor and dispersibility. Approximately 150 pounds of the Textrol was placed in a 200 gallon tank containing 1,134 pounds of water and mixed for 15 minutes using two Lightnin Mixers (trademark of Mixing Equipment Co., Inc.). Eighteen pounds of a 50 percent aqueous sodium hydroxide solution was added raising the pH to 12 and mixing was continued for about 10 minutes. Twenty six pounds of a 50 percent aqueous citric acid solution was added at the rate of approximately one-half pound per minute. The mixing was continued during the addition of the acid and the final pH was 8.0. The product was then stored in a room having an ambient temperature of 0° F. for about 6½ hours and then in a room having an ambient temperature of 40° F. for about 8 hours. The product at this point may be used as a beverage. The product, however, in this instance was spray dried using a De Laval Package Spray Dryer (Trademark of The De Laval Separator Company). The spray drying conditions were: Inlet temperature—480° F., Outlet temperature—200° F., Feed pressure—5,000 pounds per square inch gauge. The spray dried product contained 50.5 percent protein, 85 percent of which was soluble. The product further contained 7.8 percent moisture and 11.5 percent ash. A tasty beverage was prepared by mixing 12 grams of the dry modified soy material, 20 grams of Hershey's Instant Chocolate (trademark of Hershey Foods Corp.) and 8 ounces of cow's milk. The resulting beverage had 6 percent protein content which is substantially above that of the original cow's milk.

EXAMPLE II

A beverage was prepared according to the present invention using Soy Milk A[2] ([2]Trademark of Hohnen Oil Co., Japan). The Soy Milk A prior to modification contained 43.6 percent soy protein, 6.0 percent ash and 9.1 percent moisture. Seventy-eight percent of the protein was in the soluble form. The Soy Milk A was treated in a manner similar to that described with respect to Textrol in Example I. Approximately 154 pounds of the Soy Milk A was added to 1,140 pounds of water and mixed for one hour in a 200 gallon tank equipped with two Lightnin Mixers. Then 13¼ pounds of 50 percent aqueous solution of sodium hydroxide was added to the dispersion of Soy Milk A and mixing was continued for 10 minutes. The pH at that point was 12.2. Twenty-four pounds of a 50 percent aqueous solution of citric acid was added slowly over a period of 31 minutes thereby reducing the pH to 8.0. The product was then stored at 40° F. for about 16 hours. The product was then spray dried as described in Example I; however, operating conditions of the spray dryer were Inlet temperature—415° F., Outlet temperature—215° F., and Feed pressure—4,000 pounds per square inch gauge. The dry product contained 39 percent protein, 10.5 percent ash, and 7.4 percent moisture. The protein was 95 percent soluble. A beverage was prepared by dissolving 15 grams of this product together with 20 grams of Hershey's Instant chocolate in 8 ounces of milk using a Waring Blender. The treated Soy Milk A remained dissolved or suspended in the milk. The beverage thus prepared was tasty and provided approximately twice as much protein as ordinary cow's milk.

EXAMPLE III

A highly preferred embodiment of the present invention was prepared by dry blending 7.0 pounds of the modified, spray dried product of Example I; 9.5 pounds of non-fat milk solids; 3.5 pounds of granulated sugar and 1.1334 pounds of a flavoring and coloring premix* (*The premix was prepared by mixing 0.1150 pound of imitation strawberry flavor, 0.130 pound of red food coloring, 0.0054 pound of yellow food coloring and 1.00 pound of granulated sugar in a Hobart mixer at speed No. 2 for 10 minutes). The ingredients were first mixed in a ribbon-type blender for five minutes and subsequently passed through a Fitz mill. The blended material was agglomerated in an agglomerating tube substantially like that described in U.S. Pat. No. 3,288,115. The agglomerating tube had an internal diameter of 4 inches and was 20 feet in length. The air velocity in the tube was 5,000 feet per minute. The air temperature was 280° F. The relative humidity in the tube was about 42 percent. The residence time of the material in the tube was about one-half second. The material was then dried at 240° F. for between one and two and one-half minutes and cooled for thirty seconds. The product was passed through a No. 8 mesh screen.

A tasty beverage was prepared by adding 42 grams of the agglomerated powder to 156 milliliters of fresh whole milk and shaking for 15 seconds. The beverage had a consistency and appearance much like a milk shake. The beverage had a protein content of about 9.6 percent.

Another beverage was prepared by adding 42 grams of the agglomerated powder to 156 milliliters of water and shaking for about 30 seconds. The powder dissolved immediately. The resulting beverage was testy and had a consistency slightly thicker than milk but not as thick as a milk shake. This beverage contained about 6.2 percent protein.

EXAMPLE IV

A further embodiment of the present invention was prepared having a vanilla flavor. The following ingredients were dry blended as described in Example III: 7.0 pounds of the modified, spray dried product of Example I; 9.5 pounds of non-fat milk solids; 3.0 pounds of granulated sugar; and 2.1 pounds of a vanilla premix. The vanilla premix was prepared by thoroughly mixing 0.6 pounds of imitation vanilla flavor and 1.5 pounds of granulated sugar. The dry blended mixture was agglomerated as described in Example III. A beverage was prepared by thoroughly mixing 42 grams of the agglomerated powder and 156 milliliters of fresh whole milk. The beverage contained over 9 percent protein.

EXAMPLE V

A beverage was prepared by mixing 63 pounds of the modified Textrol solution of Example I (taken just prior to spray drying), 4.9 pounds of granulated sugar, 86.0 pounds of fresh whole milk, 0.078 pounds of imitation strawberry flavoring, 0.0014 pounds of red food coloring (Food and Drug Certified red No. 2) and 0.007 pounds of yellow food coloring (Food and Drug Certified yellow No. 5). This mixture was allowed to stand overnight and was then spray dried using the apparatus described in Example I. The spray drying conditions were: Inlet temperature about 400° F., Outlet temperature about 180° F., and Feed pressure about 4,000 pounds per square inch gauge. The product contained 29.6 percent protein, 6.4 percent ash and 6.2 percent moisture. Approximately 95 percent of the protein was in a soluble form. The spray dried powder was agglomerated as described in Example III. A beverage was prepared by adding 42 grams of the agglomerated material to 156 milliliters of milk in a jar container. The powder and milk were thoroughly mixed by shaking for about 30 seconds. The resulting beverage had a high protein content and was tasty.

The embodiments of the invention in which an exclusive property or privilege is claimed are defined as follows:

1. A soy beverage comprising an aqueous solution containing a nutritionally significant amount of modified soy material, said modified soy material being prepared by dispersing in water a defatted soy protein material having a protein content of between 30 and 70 percent, adding a water soluble alkaline material to said dispersion in an amount sufficient to raise the pH to about 12, and then adding an acidic material to reduce the pH to about 7.0 to 8.0.

2. The soy beverage as defined in claim 1 further including flavoring.

3. The soy beverage of claim 2 wherein said beverage includes cow's milk.

4. The soy beverage of claim 1 wherein said beverage contains between 3 and 12 per cent protein by weight.

5. A method of preparing a high protein beverage comprising the steps of dispersing a soy material in water, said soy material being a defatted soy protein material having a protein content of between 30 and 70 percent, adding a water soluble alkaline substance to solubilize the soy protein, said alkaline substance being added in an amount sufficient to raise the pH to about 12, adding an acidic substance to adjust the pH of the solution to between 7.0 and 8.0, drying the neutralized solution to a powder, and reconstituting the powder to form an aqueous solution.

6. The method of claim 5 wherein the powder is agglomerated.

7. The method of claim 5 wherein said neutralized solution is dried by spray drying.

8. The method of claim 6 wherein flavoring is added to said solution prior to spray drying.

9. The method of claim 5 wherein said aqueous liquid is a member selected from the group consisting of milk, orange juice and water.

10. The method of claim 5 wherein the alkaline substance is a member selected from the group consisting of sodium hydroxide, ammonium hydroxide, ammonia and tri-sodium phosphate and wherein the acidic substance is a member selected from the group consisting of citric acid and phosphoric acid.

* * * * *